United States Patent Office 3,244,620
Patented Apr. 5, 1966

3,244,620
SEPARATION OF ACID FROM POLYMERS BY DIALYSIS WITH ANION-EXCHANGE MEMBRANES
Robert D. Hansen and Robert M. Wheaton, Midland, Mich., assignors to The Dow Chemical Company, Midland, Mich., a corporation of Delaware
No Drawing. Filed Nov. 2, 1964, Ser. No. 408,315
11 Claims. (Cl. 210—22)

This is a continuation-in-part of application Serial No. 258,623, filed by R. D. Hansen and R. M. Wheaton on February 14, 1963, now abandoned.

This invention concerns an improved dialysis process for separating a strong acid from an aqueous solution or suspension of a polymer. More particularly it concerns a process for separating a low molecular weight, highly ionized ionorganic or organic acid from an aqueous mixture containing a polymer by dialysis with an anion-exchange membrane.

In the processing of organic polymers, aqueous mixtures of polymer and a strong acid used as a catalyst or reactant are frequently encountered. For example, in the preparation of a water-soluble sulfonated polymer by sulfonation of a intermediate polymer, the product is often obtained as an aqueous mixture of residual acid and sulfonated polymer. To recover this polymer free of inorganic salts requires removal of the strong acid prior to neutralization of the sulfonated polymer. This is difficult to achieve in a commercially feasible manner.

One possible process is conventional dialysis wherein an inert, non-ionic dialysis membrane is used to separate solutes in an aqueous solution based on their relative mobility or rate of diffusion through the membrane. Such dialysis membranes are essentially inert to mass flow, but porous enough to permit diffusion of low molecular weight mobile solutes through the membrane. Prior to recent synthetic developments, the poor strength and stability of the membranes limited the use of dialysis processes essentially to laboratory practice. Recently, the availability of new membranes with greatly increased strength and durability has vastly enlarged the utility of dialysis processes. For example, the recovery of sulfuric acid from copper refinery streams by dialysis is now commercially feasible.

The membranes employed in conventional dialysis are non-ionic, e.g., they contain essentially no ionic functional groups. Any ionic constituents adsorbed by such membranes from aqueous solution are readily removed by rinsing with distilled water. In acid dialysis these non-ionic membranes permit a selective transfer of the strong acid from the aqueous dialysate feed solution through the membrane into the rinse water on the opposite side. At the same time there generally occurs an osmotic transport or transfer of water in the reverse direction, i.e. from the rinse stream through the membrane into the dialysate liquor. The net result of conventional dialysis is the removal of the strong acid with concurrent dilution of the residual dialysate. When recovery of another solute from the residual dialysate is desired, this osmotic dilution often amounting to several hundred percent is a serious disadvantage.

It has now been discovered that use of an anion-exchange membrane instead of the conventional non-ionic membrane gives an improved dialysis separation of a strong acid from an aqueous mixture containing a polymer. In this improved acid dialysis process using the anion-exchange membrane, a preponderance of the strong acid, often 75 to 90% or more, can be transferred rapidly through the membrane without any appreciable dilution of the residual dialysate. Indeed, in some cases the dialysate effluent is even more concentrated than the initial feed liquor. This reduction of osmotic transport by use of an anion-exchange membrane is of considerable practical and economic value. Not only is the subsequent recovery of the less mobile species from the dialysate enhance by avoiding dilution, but the membrane area required for a given separation is less since the driving force for dialysis is not reduced by dilution. Still other advantages will be evident to those skilled in the art from the further description of this invention.

The terms "dialysate feed liquor," "dialysate eluent," "rinse water," and "diffusate" are used herein in a conventional manner. The dialysate feed liquor and the rinse water are the feed streams passing into the dialyzer on opposite sides of the anion-exchange membrane. The treated dialysate feed liquor passing out of the dialyzer is referred to as the dialysate eluent while the discharged rinse water is referred to as the diffusate.

As used herein, the term "strong acid" refers to low molecular weight inorganic and organic acids which are highly ionized in aqueous solution. More specifically they are characterized by a molecular weight of less than 200 and by an ionization constant, the first ionization constant in the case of polybasic acids, greater than $1.0 \times 10^{-3}$ as determined in dilute aqueous solution at 25° C. Techniques for determining ionization constants have been reviewed recently by Albert and Serjeant in "Ionization Constants of Acids and Bases," John Wiley & Sons, Inc., New York (1962).

The new acid dialysis process is particularly effective with strong mineral acids such as hydrochloric acid, hydrobromic acid, nitric acid, sulfuric acid, sulfurous acid, phosphoric acid, pyrophosphoric acid, and the like. However, it is also applicable to such organic acids as mono-, di-, and trichloroacetic acids, oxalic acid, maleic acid, o-phthalic acid, and tartaric acid which have ionization constants greater than $1.0 \times 10^{-3}$ at 25° C.

The polymer species which can be separated from the strong acid by the improved dialysis process are characterized by an average molecular weight of at least 400 and include anionic polymers in salt form and cationic polymers in acid or salt form as well as non-ionic polymers. The polymers may be dissolved in the aqueous acid mixture or dispersed as finely divided or colloidal suspensions and emulsions. In part, because of their greater molecular weight, these polymer species have a lower dialysis transport rate than the strong acid. Yet, even though the chemical and physical properties of the polymer will influence optimum process conditions and degree of separation, these factors are not controlling in the improved acid dialysis process. The nature of the dialysis membrane itself is critical.

The improved acid dialysis process is particularly suited for the separation of a strong acid and a water-soluble acidic polymer, for example the separation of sulfuric acid and a sulfonated vinylaromatic polymer, such as poly(styrene sulfonic acid) or poly(vinyltoluene sulfonic acid). But it is also advantageous in the purification of aqueous process streams containing other water-soluble polymers. Typical examples of such polymers are: water-soluble polyalkyleneoxy polyols derived from ethylene or propylene oxide; water-soluble cellulose derivatives including sodium carboxymethyl cellulose, methyl cellulose, hydroxypropyl cellulose; dextran; water-soluble salts of sulfonated polymers such as sodium polystyrene sulfonate; water-soluble phenolaldehyde and urea-aldehyde polymers. Still other water-soluble polymers which can be purified by the process described herein are poly(vinyl alcohol), poly(vinylpyrrolidone), poly(acrylates), poly(acrylamides), and ethylene oxide polymers. In addition, aqueous suspensions or emulsions of such polymers as polyethylene, polypropylene, linear and cross-linked polymers of styrene, acrylamide, vinyltoluene, acrylic acid, etc., can also be treated by the improved acid dialysis process.

An essential element in the present invention is the anion-exchange membrane. Preferably a strong-base anion-exchange membrane with quaternary ammonium functional groups is used to obtain the improved acid dialysis. The anionic form of the membrane is not important. Although conveniently prepared and employed as flat sheets, the anion-exchange membrane can be used in other forms such as tubes and hollow fibers. Such membranes must of course be essentially impervious to mass flow but porous enough to permit transfer by diffusion.

Suitable anion-exchange membranes are available commercially, for example, American Machine & Foundry AMF–A60 membrane; Ionics, Inc., A–11–A membrane; and Nalco Chemical Company Nalfilm 2 membrane. These membranes have an ion exchange capacity of at least 1.0 meq./g. dry membrane. Quaternary ammonium anion-exchange membranes are also advantageously prepared as described by Juda and McRae in U.S. Patent Re. 24,865 and by Tsunoda and Seko in U.S. Patent 2,883,349. Alternately, styrene can be grafted on to a polyethylene film or tube and then anion-exchange groups substituted on the aromatic nuclei of the copolymer by the Tsunoda and Seko process.

In the practice of the present invention, a conventional plate and frame dialysis apparatus can be conveniently used with thin anion-exchange membrane sheets. A pair or advantageously multiple pairs of anion-exchange membranes are used, each pair forming a separate compartment with the membranes arranged parallel to each other as opposite walls of the compartment. Preferably, the membranes are held in a vertical position. In units having multiple compartments, alternate cells are interconnected either in series or in parallel.

The dialysis unit is designed to pass the dialysis feed liquor into one compartment and rinse water into the two adjacent ones so that the membranes are in contact on one side with dialysis liquor and on the other with water. Countercurrent flow of the feed liquor and water is preferred. Also in a unit with vertical membranes, the feed liquor preferably flows upward through one compartment while rinse water passes downward in the two adjacent ones.

As in conventional dialysis operations, the efficiency of the separation of the highly ionized acid from the feed liquor is dependent upon such factors as the properties of the membrane including its porosity and exchange capacity, the flow rate per unit surface area of membrane, the ratio of rinse water to dialysis feed liquor, the concentration of the feed mixture, the process temperature, etc. For example, it is well known that the driving force for dialysis is proportional to the difference in chemical potential on the two sides of the membrane. Thus, for rapid removal of the strong acid from the feed liquor, its concentration in the rinse water should be kept low, conveniently by using a more rapid flow of rinse water. Hence, in the improved acid dialysis process, a flow ratio of rinse water to dialysis feed of at least one is desirable. Often flow ratios of 10 or 20 are advantageous in achieving a high removal of acid from the feed liquor.

In general, dialysis units operate effectively at atmospheric pressure, although a slight positive pressure on one side or other of the membrane may be desirable to minimize flexing of the membrane. Operation at ambient temperature is usually convenient. However, commercial anion-exchange membranes are stable to at least 60° C. and higher operating temperatures within the limits of the membrane stability can be used.

Alternative operating techniques will be apparent to those skilled in the art of dialysis and ion exchange. Optimum operating conditions for a particular system within the general scope of this invention can be determined in routine manner.

To illustrate further the present invention and the advantages obtained therefrom, the following examples are given without limiting the invention thereto. Unless otherwise specified, all parts and percentages are by weight.

*Example I.—$H_2SO_4$-sulfonated poly(vinyltoluene)*

A conventional plate and frame dialysis unit was fitted with two 25.4 cm. x 33.0 cm. American Machine & Foundry anion-exchange membranes, Type A–101. This membrane is a polyethylene-styrene graft copolymer with quaternary ammonium functional groups and an anion-exchange capacity of 1.4 meq./g. dry wt. basis, a wet thickness of 6 mils, and contains 12% gel water. An aqueous feed liquor containing 5.0 wt. percent of sulfonated poly(vinyltoluene) and 11.0 wt. percent sulfuric acid was fed upwardly through the inner compartment of the dialysis unit at a rate of 2.5 ml./min., while water was passed downwardly through the adjacent outer compartments at a rate of 41.0 ml./min. Under steady state conditions, 84.5% of the sulfuric acid was removed from the dialysate without dilution of the dialysate. In fact, the dialysate was concentrated. Its flow rate was decreased from a feed rate of 2.5 ml./min. to an eluent rate of 2.2 ml./min. Concurrently, the concentration of sulfonated poly(vinyltoluene) was increased from 5.0 to 5.7 wt. percent, an increase of 14%.

In a comparable experiment using a standard non-ionic dialysis membrane, 86% of the sulfuric acid was removed from the dialysate but with a fourfold (400%) dilution of the sulfonated poly(vinyltoluene) from a concentration of 5.0 to 1.25 wt. percent.

*Example II.—Mineral acids-water-soluble polymers*

In experiments similar to that described in Example I, highly ionized mineral acids were removed from feed liquors containing a variety of other water-soluble polymers without dilution of the dialysate stream by dialysis with an anion-exchange membrane. In these experiments American Machine & Foundry A–60 membranes were used with a flow ratio of rinse water to feed liquor of about 8. The A–60 membrane has an anion-exchange capacity of $2.0 \pm 0.2$ meq./g. dry wt., a wet thickness of $12 \pm 1$ mils, and a gell water content of $22 \pm 5\%$.

Typical results are shown in Table 1. The net decrease in dialysate flow found in these runs, note the difference in dialysate feed and effluent rates, shows clearly the absence of dilution by osmotic transport under conditions wherein 50–65% of the highly ionized mineral acid was removed. A more complete removal of the acid can be achieved by increasing the relative flow rate of rinse water, decreasing the feed rates, increasing the membrane area, etc.

TABLE 1.—IMPROVED ACID DIALYSIS WITH WATER-SOLUBLE POLYMERS

| Run | Feed Liquor | | Dialysate | | |
|---|---|---|---|---|---|
| | Acid | Polymer | Feed, ml./min. | Effluent, ml./min. | Percent Acid Removed |
| 2-1 | 2.39 N HCl | 2.14 wt. Percent Methyl Cellulose [a] | 5.10 | 4.87 | 62 |
| 2-2 | 3.14 N HNO$_3$ | 1.0 wt. Percent Polyacrylamide [b] | 5.07 | 4.62 | 57.5 |
| 2-3 | 1.04 N HNO$_3$ | 1.0 wt. Percent Polyacrylamide [b] | 5.11 | 5.00 | 50 |

[a] A high molecular weight water-soluble methyl ether of cellulose.
[b] A homopolymer having a viscosity molecular weight of about one million.

Similar results are obtained using other water-soluble polymers including polyoxyethylene glycols having an average molecular weight ranging from 400 to 9000 or more, polyoxypropylene glycols having an average molecular weight from about 400 to 1200, etc.

*Example III.*—H$_2$SO$_4$-*suspended polymer*

Using the same dialysis unit described in Example I with American Machine & Foundry A–101 membranes, 1000 g. of a solution containing 51.4 g. of concentrated sulfuric acid and 100 parts of suspended, finely ground strong-acid cation-exchange resin in acid form (Dowex 50 resin, a sulfonated styrenedivinylbenzene resin having an exchange capacity of 5.0 meq./g. dry resin H$^+$ form) was circulated from a reservoir through the inner compartment of the dialysis cell at a rate of 5.14 ml./min. Through the outer compartments was circulated 4000 g. of water at a rate of 40.5 ml./min. Both solutions were circulated countercurrently through the dialysis unit for 18 hours. Then the unit was drained and the solutions separately weighed and analyzed. The rinse solution weighed 4031 g. and contained 29.3 g. of sulfuric acid (57% of the initial dialysate acid). There had been no dilution of the dialysate containing the suspended cation-exchange resin.

We claim:
1. In a dialysis process for the separation of a strong acid characterized by a molecular weight less than 200 and an ionization constant greater than 1.0×10$^{-3}$ from an aqueous mixture with a polymer having an average molecular weight of at least 400, the improvement which comprises using an anion-exchange membrane as the dialysis membrane and thereby recovering an essentially undiluted dialysate eluent containing a reduced concentration of acid.
2. The process of claim 1 wherein the dialysis membrane is a strong-base quaternary ammonium anion-exchange membrane.
3. The process of claim 2 wherein the dialysis membrane has an anion-exchange capacity of at least 1.0 meq./g. dry membrane.
4. The process of claim 2 wherein the acid is a strong inorganic acid.
5. The process of claim 2 wherein the acid is sulfuric acid.
6. The process of claim 2 wherein the polymer is a sulfonated poly(vinylaromatic) polymer.
7. The process of claim 6 wherein the polymer is a sulfonated poly(vinyltoluene).
8. The process of claim 2 wherein the polymer is a water-soluble methyl cellulose.
9. The process of claim 2 wherein the polymer is a water-soluble polyacrylamide.
10. A process for the separation of sulfuric acid from an aqueous mixture containing a sulfonated poly(vinylaromatic) polymer which comprises passing the aqueous mixture through a dialysis cell having a strong-base anion-exchange membrane as the dialysis membrane and recovering an essentially undiluted dialysate eluent containing a reduced concentration of sulfuric acid.
11. The process of claim 10 wherein the polymer is a water-soluble sulfonated poly(vinyltoluene).

References Cited by the Examiner

UNITED STATES PATENTS

| 2,681,319 | 6/1954 | Bodamer | 210—500 |
| 2,772,237 | 11/1956 | Bauman | 210—32 |
| 2,972,586 | 2/1961 | Van de Neut | 204—180 |
| 3,003,940 | 10/1961 | Mason et al. | 204—180 |
| 3,132,095 | 5/1964 | Wolf et al. | 210—23 |

References Cited by the Applicant

UNITED STATES PATENTS

| 2,433,879 | 1/1948 | Wretlind. |
| 2,883,349 | 4/1959 | Tsunoda et al. |
| 3,132,095 | 5/1964 | Wolf et al. |

OTHER REFERENCES

Japanese Patent Publication No. 36–3624, March 20, 1961 (application No. 32–31,405, filed Dec. 19, 1957).

Japanese Patent 19,463, Oct. 16, 1961, Chem. Abst., 59, 2421 (Aug. 5, 1963).

Oda, E. A., I. & E. C. Prod. Res. and Dev., 3, 244 (Sept. 1965).

Vromen, Ind. Eng. Chem., 54, 20 (June 1962).

MORRIS O. WOLK, *Primary Examiner.*